No. 771,645.

Patented October 4, 1904.

UNITED STATES PATENT OFFICE.

FRANZ VON KÜGELGEN AND GEORGE O. SEWARD, OF HOLCOMBS ROCK, VIRGINIA, ASSIGNORS TO THE WILLSON ALUMINUM COMPANY, OF NEW YORK, N. Y., A CORPORATION OF NEW YORK.

METHOD OF DECARBURIZING METALS OR ALLOYS.

SPECIFICATION forming part of Letters Patent No. 771,645, dated October 4, 1904.

Application filed July 14, 1903. Serial No. 165,511. (No specimens.)

*To all whom it may concern:*

Be it known that we, FRANZ VON KÜGELGEN, a subject of the German Emperor, and GEORGE O. SEWARD, a citizen of the United States, residing at Holcombs Rock, in the county of Bedford and State of Virginia, have jointly invented certain new and useful Improvements in the Method of Decarburizing Metals or Alloys, of which the following is a specification.

In the production of metals and alloys, such as ferro-chromium, ferro-vanadium, chromium, vanadium, &c., by electrosmelting the ores with coke or other carbon it is very difficult to obtain the metal with a very low carbon content. Attempts to keep down the content of carbon by lowering the quantity of the reducing agent in the mixture results generally in the loss of a part of the oxid to be reduced, which is slagged off. Furthermore, the consumption of the carbon pencils or other electrodes is very large. Often the metal or alloy has to be remelted in order to decarburize it to the desired extent. This of course results in the use of an excessive amount of heat and also an excessive consumption of carbon pencils.

According to our process we obtain low-carbon metals and alloys with a great economy of heat as compared to the old processes and a small consumption of electrodes.

Our process utilizes the great affinity of calcium for carbon. We first reduce the ores with sufficient carbon to reduce substantially all the oxid without an excessive consumption of the electrodes, and then in order to bring down the carbon content we bring the metals or alloys while still molten into contact with calcium. This may be done by putting metallic calcium in the bottom of the tapping-mold and tapping the metal onto it, or the calcium may be added while the metal is still in the original furnace, or other ways might be adopted of bringing the molten metal or alloy into contact with the calcium. The calcium by reason of its great affinity for carbon forms calcium carbid, which separates from the metal while the metal is still molten and which rises to the top and is removed as slag. The affinity of the calcium for the carbon is so great that no external heat is necessary, (unless it be to keep the metal molten,) heat being generated by their union, in fact, or other ways of getting rid of the calcium carbid may be adopted. There is usually a small quantity of oxygen in the metal, and this will oxidize a part of the calcium, leaving only the remainder to unite with the carbon. It is advisable, therefore, to use an excess of calcium over that necessary to extract the carbon from the metal, the excess being proportioned to the oxygen content of the metal.

Our process has the great practical advantage of a high efficiency of production, substantially all the metal being reduced, while at the same time there is a great saving in electrodes and in the amount of heat used. The first producing of the metal or alloy with a comparatively high content of carbon effects the economies stated, and the subsequent lowering of the carbon content is unaccompanied by the loss of any of the metal or ore or any other disadvantages incident to prior processes. An extremely important advantage is in the fact that certain metals and alloys can be obtained with a carbon content considerably lower than is possible with prior processes.

Our invention may be modified by using in addition to calcium a suitable proportion of a compound of calcium or other metal to assist the decarburizing action of the calcium and to facilitate the separation from the resultant metal of the calcium carbid which is formed. Examples of such compounds are lime, ($CaO$,) fluor-spar, ($CaF_2$,) and calcium chlorid ($CaCl_2$.)

Though we have described with great particularity of detail certain processes embodying our invention, yet it is understood that the invention is not limited to the specific processes disclosed. Variations of the same may be made by those skilled in the art without departure from the invention.

What we claim is—

1. The process of obtaining metals and alloys low in carbon, which consists in bringing a metal which contains an undesirable percentage of carbon into a molten state in contact with calcium and thereby decarburizing it.

2. The process of obtaining metals or alloys low in carbon, which consists in first smelting the ore under such conditions as to secure a high output regardless of the amount of carbon in the product, and then bringing the molten product into contact with calcium and thereby decarburizing it to the desired extent.

In witness whereof we have hereunto signed our names in the presence of two subscribing witnesses.

FRANZ VON KÜGELGEN.
GEO. O. SEWARD.

Witnesses:
C. E. KREBS,
T. M. MORRISON.